United States Patent Office 3,051,808
Patented Aug. 28, 1962

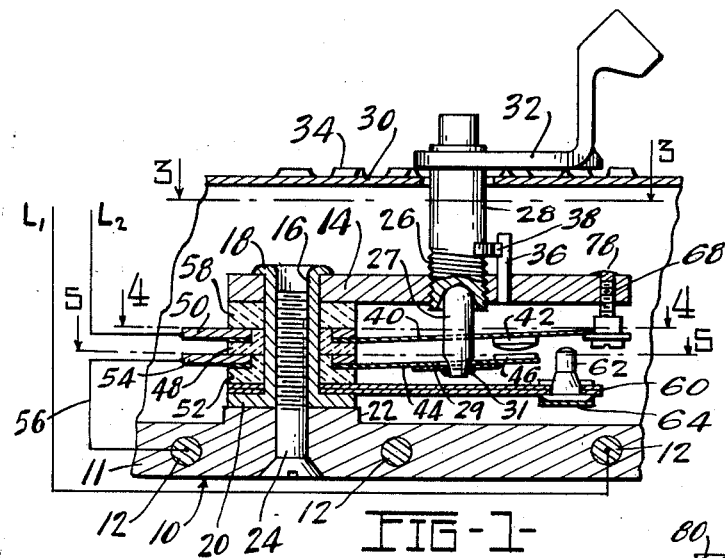

3,051,808
THERMORESPONSIVE SWITCH
Donald L. Reffel, Mansfield, Ohio, assignor to Pace, Inc., Mansfield, Ohio, a corporation of Ohio
Filed Oct. 20, 1958, Ser. No. 768,216
4 Claims. (Cl. 200—138)

This invention relates to thermoresponsive or thermostat switch means and more especially to a thermoresponsive switch means provided with manual control over the effective temperature operating range and embodying a positive "off" position below the temperature range embraced by the manual control.

Thermostat switches have been used to maintain automatic control of a predetermined temperature within a temperature range embraced within a manual control particularly for appliances embodying heating elements or units controllable within a desired temperature range substantially above the ambient or room temperature. Such appliances include flat irons, grills, fry pans and other electrically energizable appliances. In most types of thermostat switches for controlling appliances embodying heating elements, a substantial proportion of the movement of the manual control is in a useless temperature range between the lowest operating temperature of the appliance and room temperature so that only the remaining range of movement of the manual control is utilized effectively for setting a temperature at which the heating means of the appliance is to be maintained under the influence of the automatically operable thermostat of the switch construction.

Furthermore in such type of thermostat switch construction the manual control may be moved out of the temperature operating range of the appliance but no provision made against the liability that the contacts may stick together if excessive heat is generated by resistance to current flow through the contacts should they become burned or pitted through continued use.

The invention embraces a method and means for establishing a positive "off" position for the switch mechanism within the scope of movement of the manual control wherein the positive "off" position is immediately adjacent the operating heat control range of the thermostat means embodied in the switch construction.

Another object of the invention is the provision of an abutment means engageable with a component of the thermostat switch such that engagement of the switch contacts cannot be had when the manual control is in an "off" or current interrupting position.

Another object of the invention is the provision of a manually controlled thermostat switch wherein one of the contact carrying components is restrained against movement in one direction whereby the thermoresponsive means or thermostat of the switch construction is rendered ineffective to move or actuate the contact carrying component until the thermoresponsive means is subjected to an elevated temperature within the given operating temperature range.

Another object of the invention is the provision of a manually controlled thermostat switch means wherein the contact carried by one of the contact carrying components is adapted to be positioned just out of contact with a second contact carried by another component in order to obtain a positive "off" condition of the switch for all temperatures below the operating range within the scope of the manual control.

Still a further object of the invention is the provision of a positive "off" position of a manually controlled switch component at one extreme limit of the manual control whereby substantially the entire range of movement of the manual control means embraces the entire operating temperature range for various degrees of heating of the appliance whereby a more accurate manual adjustment for a desired temperature is attained.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is an enlarged longitudinal sectional view of a thermostat switch construction embodying a form of the invention showing the contact mechanism of the switch in a positive "off" position;

FIGURE 2 is an elevational view of a portion of the construction shown in FIGURE 1 illustrating the contacts of the switch mechanism in circuit completing position;

FIGURE 3 is a horizontal sectional view taken substantially on the line 3—3 of FIGURE 1;

FIGURE 4 is a sectional view taken substantially on the line 4—4 of FIGURE 1;

FIGURE 5 is a sectional view taken substantially on the line 5—5 of FIGURE 1;

FIGURE 6 is an enlarged detail sectional view illustrating the movement limiting means for one of the contact carrying switch members of the construction shown in FIGURE 1;

FIGURE 7 is a sectional view illustrating a modified form of movement limiting means for a contact carrying component to secure a positive "off" position, and FIGURE 8 is a detail sectional view taken substantially on the line 8—8 of FIGURE 7.

While the arrangement of the invention is particularly adaptable for controlling the temperature of electrically heated appliances, it is to be understood that the principles of the invention may be utilized in any mechanism adapted for control of a temperature operating range wherein a thermoresponsive element is subjected to temperature changes in an appliance or instrumentality controlled by an electric circuit.

Referring to the drawings in detail and initially to the construction illustrated in FIGURES 1 through 6, the switch means of the invention is illustrated as utilized for controlling the temperature of an electrically heated appliance such as a flat iron. As shown in FIGURE 1 the electrically heated iron 10 is inclusive of a base portion or plate 11 embodying a heating element 12 to which electrical energy is supplied through current supply conductors or power lines L–1 and L–2.

In the arrangement shown in FIGURE 1, the base plate 11 of the appliance 10 provides a support for the switch mechanism illustrated, but it is to be understood that the switch construction may be mounted upon any suitable portion of an electrically controlled appliance wherein the thermoresponsive component or element is influenced by temperature variations. The switch construction shown in FIGURE 1 is approximately twice actual size, this type of switch being sometimes referred to as a "stack" type mechanism.

The switch construction is inclusive of a plate or member 14 forming a support or frame member for certain components of the switch construction, one end region of the plate 14 being provided with a bore into which extends a sleeve 16 and a portion of the sleeve swaged or staked as shown at 18 to secure the sleeve to the member 14, the other end region of the sleeve 16 being formed with a flange 20 which in the embodiment illustrated is mounted upon a boss portion 22 of the base plate 10 of the appliance. In the switch arrangement illustrated the switch construction per se is a unit in which the components are carried by the supporting plate 14 and the supporting sleeve 16.

As shown in FIGURE 1 the interior of the sleeve 16 may be threaded to accommodate a securing bolt 24 whereby the switch construction may be secured to the appliance plate 10 providing a simple yet effective mounting or supporting means for the switch construction. The plate 14 is formed with a threaded opening adapted to receive a threaded portion 26 of a manual controlled shaft or member 28. In the embodiment illustrated in FIGURE 1 the manual control means 28 extends through an opening in a housing member 30 of the appliance.

The portion of the shaft extending above the appliance is provided with a manipulating arm or member 32 fixedly secured to the shaft and providing a convenient means for rotating or adjusting the shaft 28. A circular dial or plate 34 may be provided on the housing 30 which is calibrated over the temperature range within the rotative movement or scope of movement of the manipulating arm 32. The range of rotation of the arm 32 is slightly less than one complete revolution as indicated schematically in FIGURE 3 by a circumferential distance providing for an abutment pin 36 carried by the plate 14 to be engaged by a stop pin 38 carried by the shaft 28.

The movement limiting means for the shaft 28 provided by the abutment and stop members 36 and 38 determines the extreme limits of rotation of the manual control means of the switch mechanism. The switch construction is inclusive of a first switch member 40 fashioned of a strip of metal which is flexible so that it may be flexed or moved under the influence of a thermoresponsive means or thermostat, the switch member 40 carrying a contact 42.

A second switch member 44, formed of a strip of metal and of flexible character similar to the member 40, is equipped with a contact 46 adapted for cooperation with the contact 42 to make and break a circuit through the heating element or unit 12.

The first switch member or arm 40 is mounted upon an annular disk of insulating material 48 which surrounds the supporting sleeve 16. A terminal member 50 is in metallic contact with the switch member 40 and is insulatingly supported upon the sleeve 16, the terminal member 50 being connected to the current supply conductor or line L-2 as schematically illustrated in FIGURE 1.

The second switch member 44 is mounted in a similar manner upon an annular insulating disk 52 and is in metallic contact with a second terminal member 54 which is connected by current conductor 56 with one terminus of the heating element 12 contained in the base of the appliance 10. The terminal member 50 is insulated from the plate 14 by means of a disk 58 of insulating material.

A member 27 of insulating material such as ceramic or lava is interposed between a socket or depression in the lower end of the member or shaft 28 and the switch arm 44. The region of the switch arm 44 adjacent the member 27 is provided with a thin plate 29 welded thereto and formed with a rectangular slot 31 to accommodate a wedge shaped extremity of the strut or member 27 so that relative rotation during adjustment of the arm 32 occurs between the ceramic member 27 and the socket surface of the shaft 28. The ceramic member or strut 27 extends through an enlarged opening 33 in the switch member 40 as shown in FIGURE 4.

Thus rotation of the shaft 28, through the medium of the strut 27 is effective to control the relative position of the switch arm or member 44 to secure the desired temperature to be maintained by the thermoresponsive means.

The switch construction includes a thermoresponsive means or thermostat 60 which is a bimetallic element which, under the influence of temperature variations, is flexed for the purpose of actuating or thermostatically controlling the position of the switch member 40 in automatically maintaining a predetermined temperature within the manual range of temperature setting or adjustment of the shaft 28.

The bimetallic thermoresponsive element 60 is bored to be received on the sleeve 16 as illustrated in FIGURE 1. The distal end of the bimetallic element 60 is provided with an insulating member 62 formed of ceramic or lava which is held on secured to the bimetallic element 60 by means of a metal clip 64.

When the heating unit 12 of the appliance is energized by a circuit completed through engagement of the contacts 42 and 46 and heat is generated effective to influence the position of the thermostat element 60, the element 60 is flexed upwardly as viewed in FIGURE 1 causing the ceramic member 62 to engage the switch arm 40. When the predetermined temperature is attained, as determined by the manual adjustment of the shaft 28 controlling the position of the switch arm 44 and the contact 46, the upward flexure of the thermostat or element 60 flexes the switch arm 40 causing a separation of the contacts 42 and 46 to interrupt the current flow to the heating unit 12.

As the appliance becomes cooled, the thermostat element 60 is flexed downwardly permitting reengagement of the contacts 42 and 46 to reestablish current flow through the heating unit 12 of the appliance. The thermostat element 60 is again heated and flexed upwardly to disengage the contacts 42 and 46 to interrupt current flow. This action continues and through this method the heating unit of the appliance is maintained at a predetermined temperature as set by the manual adjustment of the relative position of the switch arm 44 through the adjusting shaft 28.

The switch construction of the present invention embodies a means effective in an "off" position of the manually adjustable arm 32 wherein the contacts 42 and 46 are positively disengaged and, in such "off" position of the manually adjustable means, are incapable of electrically contacting each other regardless of how low the temperature of the thermostat and appliance may become. An end region of the frame member or plate 14 is provided with a threaded bore adapted to receive the threaded portion or shank 66 of a member 68, the end of the threaded portion being formed with a kerf 69 as shown in detail in FIGURE 6 adapted to receive a suitable tool for adjusting the member 68 with respect to the plate 14.

The member 68 is provided with a head portion 70. Mounted upon the member 68 is a fitting or collar 72 fashioned of insulating material which is snugly received on the shank portion 66 and is positioned on member 68 by engagement with the head portion 70. The collar 72 is formed with a circular laterally extending flange 74 which, as shown in FIGURES 1, 4 and 6, is disposed in the path of movement of the distal end region of the switch member 40.

The end of the switch member 40 is above the flange 74 as shown in FIGURES 1 and 6, the flange of the collar 72 engaging the switch member and thereby determining the lowest or "off" position of the switch means by positively determining the lowermost position of the contact 42. The relative position of the switch arms or members 40 and 44 and the contacts 42 and 46 shown in FIGURE 1 is the "off" position of the switch mechanism, the arm 32 of the manually adjustable means being in an "off" position with the stop member 38 in engagement with the abutment or pin 36.

Thus it will be seen that irrespective of extent of low temperatures affecting the thermostat member 60, the latter is merely flexed in a direction away from the switch member 40, and the latter is not affected by the position of the thermostat element 60 until the latter is heated to an exent flexing or moving it upwardly to a position within the temperature range of manual adjustment of the switch member 44.

In a positive "off" position, the contacts 42 and 46 are only slightly separated and therefore only a small circumferential distance of travel of the manually actuated arm 32 is required to move the switch arm 44 and the contact 46 from an "off" position to a position corresponding to the lowest temperature of the controlled temperature range. The switch arm 40 is positioned and tensioned by its inherent stress so that in the "off" position shown in FIGURE 1 the switch member is slightly biased into engagement with the flange 74.

Through this arrangement it is unnecessary to apply or utilize an independent means flexing the switch arm 40 to an initial position. From examination of FIGURE 3 it will be noted that the manually adjusting means is rotatable through an arc of 300° or more and of this distance approximately 30° of rotation of the shaft 28 is required to separate the contacts 42 and 46 at the low temperature limit of the temperature range embraced within the rotational movement of the shaft 28 and arm 32.

By this means substantially all of the rotational movement of the shaft 28, with the exception of the initial 30° movement to separate the contact 46 from engagement with the contact 42 in an "off" position, is available for manually positioning the switch arm 44 in the various positions required to establish predetermined temperatures at which the appliance is to be maintained.

Thus if a controlled temperature range for example embraces temperatures from 200° to 420° F., the setting of the switch arm 44 for a temperature of 200° F. is just slightly spaced from the "off" position so that the contacts 42 and 46 are just in engagement to establish a circuit through the heating unit 12.

The thermostat element 60 is then flexed by increasing heat from the appliance from room temperature to 200° F. and the thermostat element calibrated so that at 200° F. the ceramic member 62 engages the switch arm 40 and elevates the latter slightly to disengage the contacts 42 and 46. Upon subsequent cooling of the thermostat 60, the ceramic member 62 is moved downwardly permitting the switch arm 40 to move downwardly and the contacts 42 and 46 to be reengaged and the circuit again completed through the heating unit 12.

In this manner the temperature of the appliance will be automatically maintained substantially at the temperature for which the mechanism is manually set. Rotation of the arm 32 in a clockwise direction as viewed in FIGURE 3 deflects the switch arm 44 upwardly to a higher temperature setting.

The raising of the temperature setting by manual adjustment elevates the manually adjustable contact 46 to a higher position so that an increased movement of the thermostat 60 at a higher temperature is required before the thermostat element effects a separation of the contacts 42 and 46 to interrupt the current flow and thereby maintain the appliance at a higher temperature for which the arm 32 is adjusted.

Through the present invention, a minimum rotation of the shaft 28 is required to flex the switch members 44 and contact 46 from the lowest temperature of the controlled temperature range to an "off" position, and in the latter position, the switch arm 40 engages the flange or abutment 74 to prevent further downward movement of the switch contact 42 and hence assuring a positive "off" condition of the switch mechanism.

The positive "off" position of the switch arm 40 is determined by the relative position of the member 68 carried by the plate 14. Thus in initially adjusting the position of the switch arm 40, a tool may be inserted in the kerf 69 in the upper end of the shank portion 66 and the member 68 rotated until the switch arm 40 is elevated to a position just separating the contacts 42 and 46. In a positive "off" position or disengagement of the contacts, the stop pin 38 on the shaft 28 is in engagement with the abutment or movement limiting member 36 carried by the plate 14.

After the initial "off" position is attained by adjustment of the member 68, a sealing compound such as solder, wax or the like indicated at 78 in FIGURES 1 and 6 may be applied to the upper portion of the bore in the plate 14 above the shank 66 to prevent further adjusting movement of the member 68. Once this adjustment is made it is permanent throughout the life of the switch mechanism.

From the foregoing description of the structural arrangement herein described and shown in FIGURES 1 through 6, the contacts 42 and 46 are positively moved to a disengaged position whenever the arm 32 is moved to an "off" position. Thus any tendency of the contacts 42 and 46 to stick together would be overcome by the positive movement of the ceramic pin 27 downwardly to move the contact 46 out of engagement with the contact 42.

An important advantage of the invention resides in the feature of utilizing substantially all of the available rotative movement of the shaft 28 to obtain various temperature settings for the appliance. The bimetallic element or thermostat 60 moves through the idle range from ambient or room temperature to a temperature at which the ceramic member 62 is effective to actuate or move the switch arm through its contact therewith at elevated temperatures within the operative temperature range.

FIGURES 7 and 8 illustrate a modified form of construction providing a positive "off" position for the switch construction. The plate or frame member 80, which corresponds to the member 14 illustrated in FIGURE 1, is provided with a depending portion 82 extending slightly beyond the distal end of the switch member or arm 40' as shown in FIGURE 7.

In this form of construction, the appliance base 11', the heating element or unit 12', the manually adjustable shaft 28', the stop member 36' and the abutment pin 38', the ceramic strut 27', the manually adjustable switch arm 44' and the bimetallic element 60' are of the same construction as the corresponding components illustrated in the form of the invention shown in FIGURE 1.

The depending portion 82 of the frame plate 80 is provided with a threaded bore to receive the threaded portion of a member 84. The member 84 is formed with a square or polygonally shaped head portion 86 which is embedded in a circular abutment member 88 formed of suitable insulating material. For example, the member 88 may be of molded nonconducting phenol-formaldehyde resin such as Bakelite or similar material.

As shown in FIGURE 8, the member 88 is eccentrically positioned with respect to the axis of the threaded member 84. The switch member 40' is of a length whereby the end region thereof engages a peripheral region or surface of the insulating member 88 providing a positive means for limiting the lowermost movement or "off" position of the switch arm 40'. The switch arm 40' is provided with a contact 42' which cooperates with a contact 46' carried by the manually adjustable switch member 44'. The switch construction illustrated in FIGURE 7 includes the bimetallic element or thermostat 60' which carries a ceramic or lava member 62' adapted to engage the switch member 40' when the heat of the appliance distorts the bimetallic member 60' in an upward direction as viewed in FIGURE 7.

The threaded member 84 carrying the insulating stop means 88 is provided with a kerf 90 adapted to receive a suitable tool for rotating the insulating member 88 to adjust the positive "off" position of the switch mechanism. As shown in FIGURE 8, the member 88 is eccentric with respect to the axis of the member 84 so that rotation or partial rotation of the eccentric member 88 provides for an adjustment of the positive "off" position, viz. that position wherein the switch member 40' is prevented from further downward movement so that a rotation of the shaft 28' to an "off" position positively effects a disengagement of the contacts 42' and 46'.

After the proper adjustment has been made of the eccentric member 88, a quantity of solder 92 may be applied in the otherwise unoccupied portion of the threaded bore containing the member 84 to prevent inadvertent adjustment or movement of the insulating member 88.

Disposed beneath a portion of member 80 is a plate or member 94 of insulating material which is coincident with the lower surface of the plate 80 adjacent the region of deflection of the switch member 40' to prevent engagement of the end region of switch member 40' with the metal plate 80 when the appliance is heated to high temperatures. The plate 94 is secured to the plate 80 by means of a rivet 96 or other suitable securing means.

Through the provision of the insulating member 94 and the stop means 88 of insulating material for limiting the downward movement of the switch member 40', there is no liability for the switch member 40' to contact the plate 80.

If desired, the member 88 of insulating material may be secured to the member 84 by other means. For example the polygonally shaped portion 86 may extend entirely through the member 88 and the extending portion swaged over into engagement with the insulating member to hold the same in fixed position relative to the member 84. The switch construction shown in FIGURES 7 and 8 functions in substantially the same manner as the switch construction shown in FIGURES 1 through 6.

It is apparent that, within the scope of the invention, modifications and different arrangements may be made other than is herein disclosed, and the present disclosure is illustrative merely, the invention comprehending all variations thereof.

I claim:

1. Switch mechanism including, in combination, a support means including a frame plate, a pair of flexible current conducting members, cooperating contacts on said current conducting members, one end of each of said members being insulatingly mounted by the support means, a thermoresponsive element arranged to engage one of the current conducting members for changing the position thereof under the influence of temperature variations, said current conducting members being disposed between the frame plate and the thermoresponsive element, manually operable means for controlling the relative position of the other of said current conducting members, said manually operable means comprising a rotatable element having a socket formed therein, a pin formed of insulating material having one end engageable in the socket formed in the rotatable element, said pin being formed at its other end with a zone of noncircular cross-section, a comparatively thin plate secured to said switch arm controlled thereby, said plate being provided with recess means adapted to receive the noncircular end zone of the pin whereby said pin is restrained against rotation during adjusting movements of the manually adjustable element, insulating means carried by the frame plate extending into the path of movement of the distal end of the current conducting member influenced by the thermo-responsive element for limiting the movement thereof in one direction, said movement limiting means being adjustable to a position to effect a separation of said contacts when the manually rotatable element is moved to a predetermined position.

2. Switch mechanism including, in combination, a support means including a frame plate, a first flexible current conducting member, a second flexible current conducting member, cooperating contacts on said current conducting members, one end of each of said members being insulatingly mounted by the support means, a thermoresponsive element arranged to engage said first current conducting member for changing the position thereof under the influence of temperature variations, said current conducting members being disposed between the frame plate and the thermoresponsive element, manually operable means for controlling the relative position of the other of said current conducting members, said manually operable means comprising a rotatable member having a socket formed therein, a strut formed of insulating material having one end engageable in the socket formed in the rotatable member, said strut being formed at its other end with a zone of noncircular cross-section, a plate secured to said second switch arm formed with a noncircular recess adapted to receive the noncircular end zone of the strut whereby said strut is restrained against rotation during adjustment of the rotatable element, insulating means carried by the frame plate extending into the path of movement of the distal end of the first current conducting member for limiting the movement thereof in one direction, said movement limiting means being adjustable to a position to effect a separation of said contacts when the manually operable element is moved to a predetermined position.

3. Switch mechanism including, in combination, a support means including a frame plate, a first flexible current conducting member, a second flexible current conducting member, cooperating contacts on said current conducting members, one end of each of said members being insulatingly mounted by the support means, a thermoresponsive element arranged to engage said first current conducting member for changing the position thereof under the influence of temperature variations, said current conducting members being disposed between the frame plate and the thermoresponsive element, manually operable means for controlling the relative position of said second current conducting member, said manually operable means comprising a rotatably adjustable element having a socket formed therein, a strut formed of insulating material having one end engageable in the socket formed in the rotatably adjustable element, said strut being formed at its other end with a zone of noncircular cross-section, said second switch arm being provided with a comparatively thin plate formed with a noncircular recess adapted to receive the noncircular end zone of the strut, whereby said strut is restrained against rotation during adjusting movements of the rotatable element, said frame plate having a transversely extending portion, means adjustably supported on the transversely extending portion of said frame plate and arranged to be engaged by the distal end of said first current conducting member for limiting the movement thereof in one direction, said movement limiting means being adjustable to a position to effect a separation of said contacts when the manually operable means is moved to a predetermined position.

4. Switch mechanism including, in combination, a support means including a frame plate, a first flexible current conducting member, a second flexible current conducting member, cooperating contacts on said current conducting members, one end of each of said members being insulatingly mounted by the support means, a thermoresponsive element arranged to engage said first current conducting member for changing the position thereof under the influence of temperature variations, said current conducting members being disposed between the frame plate and the thermoresponsive element, manually operable means for controlling the relative position of said second current conducting member, said manually operable means comprising an adjustable element having a socket formed therein, a strut formed of insulating material having one end engageable in the socket formed in the manually adjustable element, said strut being formed at its other end with a zone of noncircular cross-section, said second switch arm being provided with a comparatively thin plate formed with a noncircular recess adapted to receive the noncircular end zone of the strut whereby said strut is restrained against rotation, said frame plate having a transversely extending portion, a means adjustably supported on the transversely extending portion of said support plate, a member of insulating material carried by said adjustably mounted means, said member of insulating material having a surface area eccentric with respect to the axis of the adjustable means and engageable with the distal end of said first current conducting member for limiting the movement thereof in one direction, said movement limiting means being adjustable to a position to effect a separation of said contacts when the manually operable means is moved to a predetermined position.

References Cited in the file of this patent

UNITED STATES PATENTS

| | | |
|---|---|---|
| 2,190,276 | Smith | Feb. 13, 1940 |
| 2,317,033 | Dafforn | Apr. 20, 1943 |
| 2,742,547 | Chang-Kaing Tsai | Apr. 17, 1956 |
| 2,768,263 | Callihan | Oct. 23, 1956 |
| 2,805,302 | Reis | Sept. 3, 1957 |
| 2,897,320 | Patti | July 28, 1959 |